United States Patent
Furrer et al.

(10) Patent No.: US 6,592,922 B2
(45) Date of Patent: Jul. 15, 2003

(54) COFFEE AROMA RECOVERY PROCESS

(75) Inventors: Marc Furrer, Blonay (CH); Catherine Gretsch, Valeyres-Sous-Ursins VD (CH)

(73) Assignee: Nestec S.A., Vevey (CH)

(*) Notice: Subject to any disclaimer, the term of this patent is extended or adjusted under 35 U.S.C. 154(b) by 0 days.

(21) Appl. No.: 10/219,758

(22) Filed: Aug. 16, 2002

(65) Prior Publication Data

US 2003/0012858 A1 Jan. 16, 2003

Related U.S. Application Data

(62) Division of application No. 09/643,454, filed on Aug. 22, 2000, now Pat. No. 6,455,093.

(30) Foreign Application Priority Data

Aug. 23, 1999 (EP) .............................. 99116494
Jun. 26, 2000 (EP) .............................. 00113472

(51) Int. Cl.[7] .............................. A23F 5/00; A23F 5/30; A23F 5/34
(52) U.S. Cl. ...................... 426/386; 426/594
(58) Field of Search .................. 426/386, 594

(56) References Cited

U.S. PATENT DOCUMENTS

| | | | |
|---|---|---|---|
| 3,535,118 A | 10/1970 | Klein et al. ............... | 99/71 |
| 3,613,549 A | 10/1971 | Champion ............... | 99/236 |
| 4,100,305 A | 7/1978 | Gregg ............... | 426/385 |
| 4,100,306 A | 7/1978 | Gregg et al. ............... | 426/386 |
| 4,707,368 A | 11/1987 | Vogel et al. ............... | 426/386 |
| 5,182,926 A | * 2/1993 | Carns et al. | |
| 5,225,223 A | 7/1993 | Vitzthum et al. ............... | 426/386 |
| 6,455,093 B1 | * 9/2002 | Furrer et al. | |

FOREIGN PATENT DOCUMENTS

| | | |
|---|---|---|
| EP | 0 159 754 A | 10/1985 |
| EP | 294 177 | 12/1988 |
| EP | 043 667 | 1/1992 |
| EP | 489401 | 6/1992 |
| FR | 614919 | 12/1926 |
| FR | 2218059 | 9/1974 |
| GB | 1 206 296 A | 9/1970 |
| WO | WO 99 52378 A | 10/1999 |

* cited by examiner

*Primary Examiner*—Anthony J. Weier
(74) *Attorney, Agent, or Firm*—Winston & Strawn

(57) ABSTRACT

A process for the recovery of aroma components from coffee grounds. Coffee grounds are placed in a mixer. The coffee grounds are wet, heated, and exposed to decreased pressure to provide aroma containing gas containing aroma components. From 40% to 95% of the aroma components in the coffee grounds are collected from the aroma containing gas. The aroma components may be added to concentrated coffee extract prior to the drying of the extract. The coffee powder produced has much increased and improved aroma and flavor.

23 Claims, No Drawings

COFFEE AROMA RECOVERY PROCESS

This is a division of application Ser. No. 09/643,454, filed Aug. 22, 2000, now U.S. Pat. No. 6,455,093. The entire contents of the prior application are incorporated herein express reference thereto.

FIELD OF THE INVENTION

This invention relates to a process for the recovery of aroma components from roasted and ground coffee. The recovered aroma components are useful for aromatising soluble coffee powders. The invention also relates to new aromatized soluble coffee powders.

BACKGROUND OF THE INVENTION

Aromas are an important part of many products since consumers associate certain aromas with certain products. If the product lacks the aroma associated with it, consumer perception of the product is adversely affected. This is particularly a problem in the field of soluble coffee powders, although it also exists in other fields. Soluble coffee powders, which are obtained from commercial processes involving extraction, concentration, and drying are usually substantially aroma-less. For this reason, it is conventional to recover coffee aromas which are given off during the processing of the soluble coffee powder and to reincorporate these aromas into concentrated coffee extract prior to drying into the soluble coffee powder.

The coffee aromas are recovered at several points during processing of the soluble coffee powder and most commonly during grinding of the roasted beans and by steam stripping of the coffee extract prior to concentration and drying of the soluble coffee solids.

The recovery of aroma from ground coffee is disclosed in U.S. Pat. No. 3,535,118. This patent discloses a process in which roast and ground coffee is placed in a column and maintained at about 40° C. The bed of coffee is then moistened by spraying water on it to assist in displacing aromas from the coffee particles. An inert gas, usually nitrogen, is heated to about 44° C. and introduced into the column from beneath the bed. As the inert gas passes up through the bed, it strips the aromas from the coffee particles. The inert gas is then fed to a condenser which is operated at a temperature of about 5° C. to condense water in the inert gas. The de-watered inert gas is ultimately fed to a cryogenic condenser to condense the aroma as a frost. The frost is then recovered.

Another process for recovering aroma from roast and ground coffee is described in international patent application WO 97/10721. In this process, the ground coffee is transported through an elongated mixing zone while being agitated. At the same time, an aqueous fluid is sprayed into the elongated mixing zone to moisten the ground coffee as the ground coffee is being transported and agitated. Aroma gases released by the moistened ground coffee in the elongated mixing zone are drawn off and are collected.

One of the problems perceived to arise with these processes is that they result in pre-wetting of the coffee grounds outside of the extraction cell or column. According to Sivetz, M and Desrosier N. W.; 1979; *Coffee Technology*, AVI Publishing Company, Inc., page 334, this practice is bad because it "causes staling of ground coffee in less than an hour, accompanied by a heavy, undesirable flavour and a loss in natural coffee volatiles." Sivetz and Desrosier strongly advocate that first wetting of the coffee grounds should occur in the extraction cell or column. Consequently recovery of aroma from ground coffee by pre-wetting is not common practice, despite ground coffee being a good source of aroma.

Further, not all components of the aroma obtained in a cup of freshly brewed coffee are captured during pre-wetting. Consequently, unless further aroma is captured later during the process, some aroma components are lost; components which would, if incorporated into instant coffee powder, improve the aroma of a beverage prepared from the instant coffee powder. Further, many of the conventional recovery techniques damage or alter the aroma components.

Therefore there is still a need for a process for recovering aroma from ground coffee.

SUMMARY OF THE INVENTION

This invention provides a process for the recovery of aroma components from fresh coffee grounds, the process comprising:

wetting the coffee grounds, heating the coffee grounds, exposing the coffee grounds to decreased pressure for providing aroma containing gas, and capturing the aroma containing gas.

The process provides the advantage that significantly larger amounts of aroma components may be obtained from the coffee grounds than with conventional processes. Further, since the aroma components are obtained from the coffee grounds prior to extraction, thermal degradation of the aroma is reduced to a minimum. Also, since these aroma components are removed from the coffee grounds, staling of the coffee grounds prior to extraction may be reduced. The aroma components may be readily incorporated to provide a soluble coffee product which has increased and improved aroma and flavour. Further, volatile compounds which arise during extraction and which are responsible for a processed aroma and taste, are not collected.

The process may further comprise repeatedly exposing the coffee grounds to decreased pressure followed by heating. The coffee grounds are subjected to this cycle from about 2 to about 10 times.

The process may further comprise heating the coffee grounds while they are exposed to the decreased pressure. For example, the coffee grounds may be maintained at a substantially constant temperature while they are exposed to decreased pressure.

This process allows about 40% to about 95% of volatile aroma components in the coffee grounds to be collected in the aroma containing gas. In the present context the volatile aroma is measured above roast and ground suspension by static headspace sampling and gas chromatography. The aroma recovery % is determined by comparing aroma concentration of roast and ground before and after the process of the invention.

Further, the process provides that the collected aroma containing gas will contain at least 700 parts per million of aroma carbon, based on fresh ground coffee.

The invention also provides a soluble coffee product containing the aroma components recovered as described above.

The invention further provides a new aromatised, spray-dried soluble coffee powder which when reconstituted in water to a solid content of 3.3% by weight of the reconstituted beverage comprises a concentration of aroma volatile of at least 50 ppm for the sum of aroma compounds having a retention index $RI_{DBWAX} < 1130$, and at least 4 ppm for the sum of aroma compounds having a retention index of $1130 \leq RI_{DBWAX} \leq 1430$.

The invention also provides a new aromatised, freeze-dried soluble coffee powder which when reconstituted in water to a solid content of 3.3% by weight of the reconstituted beverage comprises a concentration of aroma volatile of at least 100 ppm for the sum of compounds having a retention index $RI_{DBWAX}<1130$, and at least 7 ppm for the sum of compounds having a retention index of $1130 \leq RI_{DBWAX} \leq 1430$.

In the present context the concentration of the aroma volatile is given in values measured by static headspace sampling and gas chromatography above reconstituted beverage. Instant coffees are reconstituted in water to a solid content of 3.3% by weight of the reconstituted beverage. Samples of 5 ml are measured at 60° C. as described above. Headspace sampling is obtained by pressurizing 22 ml vials at 10 Psi. Elution is performed on a polar capillary column coated with polyethyleneglycol phase, and coupled with an atomic emission detector. The detector response is calibrated with an external standard, 4-methylthiazole 50 ppm in water, analysed with similar conditions. Volatile aroma compounds are summed into zones according to their retention index: zone 1: $RI_{DBWAX}<1130$, zone 2: $1130 \leq RI_{DBWAX} \leq 1430$.

It has been found that the present invention is very efficient to recover high volatile compounds from roast and ground coffee. It has further been found that the reconstituted beverage according to the invention has a significantly higher concentration of volatile compounds than a beverage reconstituted from commercial available instant coffee, namely for compounds having a retention index (RI) inferior to 1430 as defined on a Carbowax GC column (zone 1: $RI_{DBWAX}<1130$ and zone 2: $1130 \leq RI_{DBWAX} \leq 1430$). Among these volatile compounds, the detected odorous components are known to influence coffee aroma balance (e.g. aldehydes, diketones, pyrazines, sulphur containing compounds).

In an additional aspect the invention provides a new aromatised, spray-dried soluble coffee powder which when reconstituted in water to a solid content of 3% by weight of the reconstituted beverage comprises at least 0.09 ppm/dry matter beta-myrcene and at least 0.07 ppm/dry matter limonene. The soluble spray-dried powder according to the invention more preferably has, a concentration of beta-myrcene relative to the standard that lies between 0.10 and 0.26 ppm/DM, and a concentration of limonene relative to the standard lies more preferably between 0.10 and 0.20 ppm/DM.

The invention also provides a new aromatised, freeze-dried soluble coffee powder which when reconstituted in water to a solid content of 3% by weight of the reconstituted beverage comprises at least 0.07 ppm/dry matter beta-myrcene and at least 0.05 ppm/dry matter limonene. The freeze-dried powder according to the invention more preferably has a concentration of beta-myrcene relative to the standard that lies between 0.10 and 0.25 ppm/DM, and a concentration of limonene relative to the standard lies more preferably between 0.10 and 0.3 ppm/DM.

In the present context the characterisation of volatile compounds values of beta-myrcene and limonene are determined by headspace enrichment (solid phase microextraction, fiber coated with 65 micrometer of polydimethysiloxane divinylbenzene) measured above reconstituted beverage of instant coffee. Elution is performed on a polar capillary DBWAX column coupled with a mass detector (full scan mode, MD800 from Fisons). Results are expressed in ppm on dry matter (ppm/DM) according to a standard being ethylbutyrate, 0.5 microgram per sample. In the quantification the fragments 93 are used to quantify beta-myrcene and limonene and fragment 71 is used to quantify the standard. The instant coffee is reconstituted in water to a solid content of 3% by weight of the reconstituted beverage. Headspace of samples containing 5 ml of solution spiked with the standard in 22 ml vials is enriched during 30 minutes at 30° C., and then analysed as described above.

It has further been found that the overall higher recovery of broad ranges of compounds is improving the quality of the product. Furthermore, it is believed that the high recovery of beta-myrcene and limonene are considered to be an indicator of the high efficiency of the process in recovering lipophilic and sensitive compounds. These compounds are very sensitive to processing conditions; if the coffee grounds are subjected to harsh conditions, generally no detectable beta-myrcene and a significantly reduced amount of limonene will be present in the end product. The high values of these compounds in the soluble coffee powder may be desirable as they are thought to be an indication of high amounts of high quality aroma compounds being recovered. In traditional soluble coffee manufacturing process steps, such compounds will generally not survive. The soluble coffee product according to the invention is found to be of high quality. Further, it has been found that particular high values of these compounds may be obtained when the aroma gas is subjected to cryogenic condensation

DETAILED DESCRIPTION OF THE PREFERRED EMBODIMENTS OF THE INVENTION

Embodiments of the invention are now described by way of example only. This invention is based on the capturing of large amounts of aroma components from fresh coffee grounds prior to normal processing of the coffee grounds. This provides the advantage that minimum amounts of aroma components are lost or degraded during the processing.

The process requires fresh roasted and ground coffee. The coffee grounds may be provided as is conventional. The fresh coffee grounds are introduced into a mixing tank in which aroma is extracted. The mixing tank may be any suitable mixing tank such as a conical mixer with a driving screw or a ribbon blender. The mixing tank is preferably sealed to prevent aroma loss. However, if any aroma components are allowed to escape they should be collected, for instance by directing the aroma components to a condenser.

The coffee grounds are agitated and aqueous liquid is sprayed on the coffee grounds to wet them. The aqueous liquid, for example, may be water or coffee extract or any other suitable liquid. The amount of aqueous liquid is not critical, but the moisture content of the wet coffee grounds is preferably about 10% to about 100% by weight, more preferably from 10% to about 50% by weight. For example, the moisture content of the wet coffee grounds may be about 20% to about 40% by weight. Wetting the coffee grounds improves the release of aroma containing gas out of the coffee grounds.

The wet coffee grounds are then heated in the mixing tank; preferably, the coffee grounds are heated uniformly. Any suitable means for heating the wet coffee grounds may be used. For example, steam may be used to heat the wet coffee grounds. The wet coffee grounds may be heated to a temperature of about 50° C. to about 95° C. Heating the wet coffee grounds to temperatures lower than usual brewing temperatures is believed to help prevent aroma degradation reactions. Heating the wet coffee grounds is believed to facilitate the later release of aroma containing gas.

Once the coffee grounds are heated, they are exposed to decreased pressure to induce vaporisation of aroma components. If the system is not pressurised, the decreased pressure may be provided by a vacuum pump. However, if the system is pressurised, the decreased pressure may be induced by a vent or the like. In the case where a vacuum pump is used, the pressure may be decreased from about 75 mbar to about 900 mbar. However, in all cases, the pressure should be reduced below the vapour pressure of water at the temperature within the mixing tank.

The heated coffee grounds may be exposed to the decreased pressure using a batch or cyclic method or a continuous method. The batch or cyclic method includes stopping or reducing the heating of the coffee grounds and then exposing them to the decreased pressure. Preferably, the pressure in the system is reduced rapidly. For example, the pressure may drop about 250 mbar in one minute. As the coffee grounds are exposed to the decreased pressure, the induced vaporisation causes the coffee grounds to cool. If further cycles are required, exposure to the decreased pressure is cut, and the coffee grounds are again heated. The coffee grounds may again be exposed to the decreased pressure. The exposure to the decreased pressure may be for about 0.5 to about 3 minutes per cycle. This cyclic process may be repeated from about 2 to about 10 times. The preferable total time of heating or exposing the coffee grounds to the decreased pressure is about 5 to about 15 minutes.

The continuous method includes heating the coffee grounds and then exposing the coffee grounds to the decreased pressure while maintaining the heating. The heating and the pressure may be adjusted so that the coffee grounds remain at a relatively constant temperature and at a relatively constant pressure. In this case, the temperature is preferably about 70° C. to about 95° C., alternatively the temperature is about 70° C. to about 90° C. The pressure is preferably about 300 mbar to about 900 mbar. Alternatively, the pressure is about 350 mbar to about 700 mbar. For example, the pressure may advantageously be about 350 mbar to about mbar 550 mbar. Of course, it is not necessary for the temperature and pressure to remain constant and they may be allowed to drift over time. The preferable total time of heating and exposing the coffee grounds to the decreased pressure is about 4 to about 12 minutes.

The heating and exposure to the decreased pressure causes the release of aroma containing gas. This gas is drawn off and collected. Once the aroma containing gas has been collected from the coffee grounds, the aroma containing gas is then processed to capture aroma components. This may be carried out using conventional techniques. For example, the gas stream may be led to a condenser system. The condenser system is operated at a temperature sufficiently low to condense most of the aroma from the gas stream. A temperature of below about 50° C. is suitable although cooling to below 30° C. is preferred; especially less than about 20° C. More than one condenser may be used, each succeeding condenser being operated at a lower temperature than the previous condenser. Preferably the most downstream condenser is operated at a temperature of about −10° C. to about 10° C.; for example at about 0° C.

If it is desired to concentrate the aroma components using partial condensation, the gas stream may be subjected to a first condensation step at a high temperature; for example at about 40° C. to about 80° C. This will result in the condensation of primarily water. The non-condensing and concentrated aroma components may then be subjected to a second condensation step at a lower temperature; for example at about 0° C. to about 40° C. to provide the aroma liquid.

The aroma liquid removed from the condenser system contains aroma components which may be used to aromatise coffee extract as explained below or may be used to aromatise soluble coffee powder.

Aroma components which do not condense in the condenser system may be directed to a cryogenic aroma condenser for collection. Many suitable cryogenic aroma condensers are known and have been reported in the literature. However, a particularly suitable cryogenic aroma condenser is described in U.S. Pat. Nos. 5,182,926 and 5,323,623; the disclosures of which are incorporated by reference. Further details of the operation of this cryogenic aroma condenser may be obtained from the disclosures in the patents. Plainly other cryogenic aroma condensers may be used; for example that disclosed in U.S. Pat. No. 5,030,473. The aroma collected in the cryogenic aroma condenser is in the form of a frost. The frost may be used to aromatize coffee extract as explained below. Alternatively, the frost may be combined with a suitable carrier substrate such as coffee oil or an emulsion containing coffee oil. This aromatized carrier is conveniently added to the soluble coffee powder finally produced.

After the aroma containing gas has been extracted from the coffee grounds, the moist de-aromatised coffee grounds are processed. For example, the moist de-aromatised coffee grounds are transported to an extraction system. The extraction system may be any suitable system since this aspect is not critical to the invention. Suitable extraction systems include batteries of fixed bed cells, plug flow reactors, moving bed reactors and the like. During the extraction process, the coffee grounds may be subjected to one or more thermal solubilisation steps.

The coffee extract leaving the extraction system is then concentrated as is conventional. Some of the coffee extract may be used as the aqueous liquid for wetting the coffee grounds instead of being concentrated. The aroma liquid removed from the condenser system may then be added to the concentrated extract. If desired, the aroma components in the aroma liquid may be concentrated prior to being added to the concentrated extract. Concentration may be carried out using conventional procedures such as partial condensation, rectification, membrane concentration and freeze concentration. Also, the frost obtained from the cryogenic aroma collector may be added to the concentrated extract.

The aromatized extract is then dried in the usual manner to provide an aromatized, soluble coffee powder; for example by spray- or freeze-drying. Of course, the aroma liquid and aroma frost may be used for other aromatisation purposes.

It is found that the process allows the removal from about 40% to about 95% of the volatile aroma compounds in the coffee grounds based on gas chromatography analysis of a suspension of coffee particles. Globally, the quantity of aroma collected is roughly two times more than the quantity usually stream-stripped from the fresh extract, based on total organic compound analysis of aqueous aroma condensates. Furthermore, the total aroma collected in the coffee is at least 700 parts per million carbon based on fresh ground coffee.

The aromatised, soluble coffee powder may be reconstituted as usual to provide a coffee beverage. Sensory profiling of this coffee beverage compared to a reference coffee beverage shows that soluble coffee made with this process has significantly more overall and roasty flavour, and more reduced caramel notes typical of soluble coffee.

The aroma profile of the coffee product of the present invention has been found to provide a desirable coffee aroma to the beverage product.

An aromatised soluble coffee powder with this type of aroma profile may be obtained with the above described process.

Specific examples of the invention are now described to further illustrate the invention.

EXAMPLE 1

Fresh coffee grounds are introduced into a conical mixer and the mixer is activated. A vacuum pump is used to reduce the pressure in the mixer to about 150 mbar and is then shut off. Water is sprayed onto the coffee grounds until the water accounts for about 30% of the total weight. Steam is injected into the bottom of the mixer and the coffee grounds are uniformly heated to about 80° C. while the pressure in the mixer rises to about 500 mbar. The vacuum pump is turned on as the steam is simultaneously stopped. The pressure is decreased to about 150 mbar and the temperature is decreased to about 60° C. After about one minute, the vacuum pump is turned off and the steam is turned on until the temperature of the coffee grounds is again 80° C. The process is repeated three more times. The total process time from the activation of the vacuum pump until the inactivation of the vacuum pump at the end of the last cycle is about 12 minutes.

Aromatized gas generated in the mixer is drawn off and is condensed in a condenser operating at about 0° C. The condensed liquid is collected and analysed for aroma components. The uncondensed gas is transported to a cryogenic aroma collector preferably operating at about at −140° C. or above, more preferably at about −130° C. The aroma frost is collected in the cryogenic aroma collector.

The aqueous aroma is found to contain 735 part per million of aroma carbon, based on fresh ground coffee. The cryogenic aroma is found to contain 74 parts per million of aroma carbon, based on fresh ground coffee. Hence the total aroma contains 809 parts per million of aroma carbon, based on fresh ground coffee.

The moist coffee grounds leaving the mixer are subjected to extraction in an extraction and concentration system as is conventional.

The condensed liquid from the condenser is added to the concentrated extract and the extract is dried to soluble powder in a spray-drying tower. The aroma frost from the cryogenic aroma collector is also added to the soluble powder in the usual manner.

A teaspoon of the soluble powder is dissolved in 150 ml of hot water at 85° C. The beverage is evaluated by a trained panel and is found to have a brew-like flavour and aroma with good coffeeness, acidity, body, and roastiness and reduced caramel notes.

EXAMPLE 2

Fresh coffee grounds are introduced into a conical mixer and the mixer is activated. A vacuum pump is used to reduce the pressure in the mixer to about 150 mbar. Water is sprayed onto the coffee grounds until the water accounts for about 30% of the total weight. Vacuum is then shut off. Steam is injected into the bottom of the mixer and the coffee grounds are uniformly heated to about 80° C. while the pressure in the mixer rises to about 450 mbar. The coffee grounds are then exposed to the decreased pressure as heating is continued. The temperature is kept at about 80° C. and the pressure is kept at about 450 mbar. The total process time from the activation of the heating and vacuum pump until the inactivation of the heating and vacuum pump is about 8 minutes. The processing of the aromatized gas then follows as described in Example 1.

The aqueous aroma is found to contain 738 part per million of aroma carbon, based on fresh ground coffee. The cryogenic aroma is found to contain 87 parts per million of aroma carbon, based on fresh ground coffee. Hence the total aroma contains 825 parts per million of aroma carbon, based on fresh ground coffee.

A teaspoon of the soluble powder is dissolved in 150 ml of hot water at 85° C. The beverage is evaluated by a trained panel and is found to have a brew-like flavour and aroma with good coffeeness, acidity, body, and roastiness and reduced caramel notes.

EXAMPLE 3

Soluble spray-dried coffee is produced as describe in example 2. Soluble freeze-dried coffee is produced as described in these examples but the spray-drying step it replaced by freeze-drying. These samples are compared to commercial available spray-dried and freeze dried soluble coffees. The concentration of aroma volatile above soluble coffee reconstituted in water is measured.

The aroma components are described using concentration of volatile aroma compounds above reconstituted beverage. The volatile aroma concentration is analysed by measuring by static headspace sampling and gas chromatography the volatile concentration above reconstituted beverage. The equipment used for these measurements is standard commercial available equipment which may e.g. be obtained from Hewlett Packard. A appropriate model is a Headspace autosampler 7694, Gas Chromatograh 6890 and Atomic Emission detector 2350A.

Headspace sampling is obtained by pressurizing 22 ml vials at 10 Psi. Elution is performed on a polar capillary column coated with polyethyleneglycol phase, and coupled with an atomic emission detector. Volatile aroma compounds are summed into zones according to their retention index: zone 1: $RI_{DBWAX}<1130$, zone 2: $1130 \leq RI_{DBWAX} \leq 1430$. The detector response is calibrated with an external standard, 4-methylthiazole 50 ppm in water, analysed with similar conditions.

The volatile aroma compound measured in zone 1 are indicative of furans, aldehydes, ketones, esters and sulphur containing compounds. The volatile aroma compound measured in zone 2 are mainly indicative of nitrogen containing volatile components.

Instant coffees are reconstituted in water to a solid content of 3.3% by weight of the reconstituted beverage. Samples of 5 ml are measured at 60° C. as described above.

Soluble coffee products available on the Japanese market compared to product of the invention:

|  | ppm* zone 1 | ppm* zone 2 |
|---|---|---|
| Aroma in ™ AGF (FD) | 34 | 3.7 |
| Maxim ™ AGF (FD) | 48 | 5.3 |
| Nescafé Gold Blend ™ (FD) | 38 (100%) | 4.6 (100%) |
| Filter drip Brew** | 85 | 6.9 |
| roast and ground suspension** | 124 | 10.5 |
| Freeze-dried product of the invention** | 109 (287%) | 8.0 (174%) | ppm*: Atomic Emission detection response for Carbon line at 193 nm is expressed in ppm according to 4-methylthiazole external standard measured in similar conditions than coffee reconstituted solutions
**Samples using same roast and ground coffee as Nestlé commercial Gold Blend, and analyzed stoechiometrically relative to the corresponding instant coffee
Abbreviations: FD (Freeze-Dried), SD (Spray-Dried), AGF (Ajinomoto General Foods Inc), and KJS (Kraft Jacobs Suchard).

Soluble coffee products available on the U.K. market compared to product of the invention:

|  | ppm* zone 1 | ppm* zone 2 |
|---|---|---|
| Kenco Carte Noire ™ KJS (FD) | 42 | 4.4 |
| Kenco Really Rich ™ KJS (FD) | 30 | 3.6 |
| Maxwell ™ KJS (SD) | 35 | 3.0 |
| Nescafé Original ™ | 30 (100%) | 3.5 (100%) |
| Spray-Dried product of the invention | 67 (223%) | 7.6 (217%) |

It has been found that the present invention is very efficient to recover high volatile compounds from roast and ground coffee. Consequently, the reconstituted beverage according to the invention of corresponding instant coffee has a significantly higher concentration of volatile compounds eluted in zones 1 and 2, than a beverage reconstituted from commercial available instant coffee. Among these volatile compounds, the detected odorous components are known to influence coffee aroma balance (e.g. aldehydes, diketones, pyrazines, sulphur containing compounds).

Compared to commercially available instant Nescafé™, the global concentration of volatile compounds of the soluble coffee products according to the invention eluted in zone 1 increases by at least 50% up to 300%. In some cases an increase of 200 to 300% is observed. Highest values correspond to an exhaustive recovery of high volatile compounds from corresponding roast and ground coffee (the aroma of roast and ground suspension is taken to be 100% in zone 1).

Compared to available instant coffees, the global concentration of compounds in the soluble coffee products according to the invention eluted in zone 2 increases by at least 100% up to 300%. For some samples an increase of 150 to 250% is observed. Highest values correspond to 70% up to 80% of the aroma concentration measured in a suspension of corresponding roast and ground coffee (the aroma of roast and ground suspension is taken to be 100% in zone 2).

EXAMPLE 4

Soluble spray-dried coffee is produced as described in example 2. Soluble freeze-dried coffee is produced as described in these examples but the spray-drying step it replaced by freeze-drying. These samples are compared to commercial available spray-dried and freeze dried soluble coffees. The characterisation of volatile compounds more specific to the product samples are measured using headspace enrichment.

The characterisation of volatile compounds using headspace enrichment (solid phase micro-extraction, fiber coated with 65 micrometer of polydimethysiloxane divinylbenzene) is measured above reconstituted beverage of instant coffee. Elution is performed on a polar capillary DBWAX column coupled with a mass detector (full scan mode, MD800 from Fisons). Results are expressed in ppm on dry matter (ppm/DM) according to internal standard (ethylbutyrate, 0.5 microgram per sample). In the quantification the fragments 93 are used to quantify beta-myrcene and limonene and fragment 71 is used to quantify the standard.

Instant coffees are reconstituted in water to a solid content of 3% by weight of the reconstituted beverage. Headspace of samples containing 5 ml of solution spiked with internal standard in 22 ml vials is enriched during 30 minutes at 30° C., and then analyzed as described above.

Soluble coffees available on the Japanese market compared to products according to the invention

|  | ppm/DM beta-myrcene | ppm/DM limonene |
|---|---|---|
| Aroma in ™ AGF (FD) | 0.001 | 0.005 |
| Maxim ™ AGF (FD) | 0.005 | 0.007 |
| Nescafé Gold Blend ™ (FD) | 0.001 | 0.007 |
| Nescafé Excella ™ (SD) | 0.002 | 0.003 |
| Freeze-dried product of the invention | 0.10 | 0.07 |
| Spray-Dried product of the invention | 0.20 | 0.16 | ppm/DM: mass fragment 93 for beta-myrcene and limonene are used for quantification, according to fragment 71 of internal standard ethylbutyrate.

Soluble coffees available on the UK market compared to products of the invention

|  | ppm/DM beta-myrcene | ppm/DM limonene |
|---|---|---|
| Kenco Carte Noire (FD) ™ KJS | 0.019 | 0.018 |
| Kenco Really Rich (FD) ™ KJS | 0.001 | 0.006 |
| Maxwell ™ (SD) KJS | 0.001 | 0.005 |
| Nescafé Gold ™ (FD) | 0.001 | 0.005 |
| Nescafé Original ™ (SD) | 0.001 | 0.003 |
| Spray-Dried product of the invention | 0.15 | 0.12 |
| Freeze-dried Product of the invention | 0.55 | 0.08 | ppm/DM: mass fragment 93 for beta-myrcene and limonene are used for quantification, according to fragment 71 of internal standard ethylbutyrate.

The comparative tests show that two odorous compounds are specific of instant coffees according to the invention: beta-myrcene (7-methyl 3-methylene 1,6-octadiene) and limonene (1-methyl 4-isoprenyl cyclohexene) their concentrations are significantly increased in the new products.

The two compounds, beta-myrcene and limonene are known to belong to coffee aroma (TNO data bank "Volatile compounds in food"). They are both detected in roast and ground coffee suspension and filter drip brew using the method described above. Relative values according to specific calibration method indicates that their recovery in brew lies between 10 and 25% (100% being the content determined in roast and ground suspension). For soluble coffee powders according to the invention an increased recovery is found compared to the brew, by a factor 3 to 5.

What is claimed is:

1. A process for preparing a soluble, aromatized coffee powder which comprises:
    wetting a portion of coffee grounds having aroma components;
    heating the coffee grounds uniformly to a temperature of about 50° C. to 95° C.;
    exposing the coffee grounds to decreased pressure while agitating the coffee grounds during the wetting, heating, and decreased pressure to release a substantial amount of the aroma components therefrom as an aroma-containing gas;
    capturing the aroma-containing gas so as to minimize the loss of aroma components; and
    forming the soluble coffee powder so as to include the aroma-containing gas.

2. The process of claim 1, wherein the forming further comprises extracting soluble coffee solids from the coffee grounds and concentrating the extracted soluble coffee solids to provide a concentrated coffee extract.

3. The process of claim 2, which further comprises combining the concentrated coffee extract and the aroma-containing gas to provide an aromatized extract.

4. The process of claim 3, which further comprises spray-drying the aromatized extract to provide the aromatized coffee powder.

5. The process of claim 3, which further comprises freeze-drying the aromatized extract to provide the aromatized coffee powder.

6. The process of claim 1, wherein the coffee grounds are heated to about 70° C. to 95° C.

7. The process of claim 6, wherein the coffee grounds are heated under a decreased pressure of about 300 mbar to 900 mbar.

8. The process of claim 1, which further comprises repeatedly exposing the coffee grounds to decreased pressure followed by additional heating before capturing the aroma-containing gas.

9. The process of claim 8, wherein the coffee grounds are subjected to about 2 to about 10 cycles of decreased pressure followed by additional heating.

10. The process of claim 9, wherein each cycle of decreased pressure and additional heating lasts for about 0.5 to about 3 minutes per cycle.

11. The process of claim 9, wherein the coffee grounds are exposed to a total heating time of about 5 to about 15 minutes.

12. The process of claim 1, wherein the pressure is rapidly decreased by at least about 250 mbar per minute.

13. The process of claim 1, wherein the pressure is decreased to about 150 mbar.

14. The process of claim 1, which further comprises heating the coffee grounds while under decreased pressure.

15. The process of claim 14, wherein the coffee grounds are maintained at a temperature of about 70° C. to about 90° C. and a pressure of about 350 mbar to about 700 mbar.

16. The process of claim 1, wherein about 40% to about 95% of the aroma components are collected in the aroma-containing gas.

17. The process of claim 1, wherein the aroma-containing gas comprises at least 700 ppm of aroma carbon based on fresh ground coffee.

18. The process of claim 1, wherein the capturing comprises:
    subjecting the aroma-containing gas to condensation at a temperature of about −10° C. to about 30° C.; and
    subjecting the aroma-containing gas to cryogenic condensation at a temperature of less than about −80° C.

19. A method of providing a reconstituted coffee beverage, which comprises:

wetting a portion of coffee grounds having aroma components;

heating the coffee grounds uniformly to a temperature of about 50° C. to 95° C.;

exposing the coffee grounds to decreased pressure to provide the aroma components as an aroma-containing gas while agitating the coffee grounds during the wetting, heating, and decreased pressure;

capturing the aroma-containing gas;

forming a soluble coffee powder so as to include the aroma-containing gas; and reconstituting the soluble coffee powder in water to form the reconstituted coffee beverage having a solid content of 3% by weight of the reconstituted beverage and which comprises at least 0.09 ppm/dry matter beta-myrcene and at least 0.07 ppm/dry limonene.

20. A method of providing a reconstituted coffee beverage, which comprises:

wetting a portion of coffee grounds having aroma components;

heating the coffee grounds uniformly to a temperature of about 50° C. to 95° C.;

exposing the coffee grounds to decreased pressure to provide the aroma components as an aroma-containing gas while agitating the coffee grounds during the wetting, heating, and decreased pressure;

capturing the aroma-containing gas;

forming a soluble coffee powder so as to include the aroma-containing gas; and reconstituting the soluble coffee powder in water to form the reconstituted coffee beverage having a solid content of 3.3% by weight of the reconstituted beverage and which comprises a concentration of aroma components of at least 50 ppm for a sum of aroma compounds having a retention index $RI_{DBWAX} < 1130$, and at least 4 ppm for a sum of aroma compounds having a retention index $1130 \leq RI_{DBWAX} \leq 1430$.

21. The method of claim 20, in which the concentration of aroma components includes from 50 to 170 ppm for the sum of aroma compounds having a retention index $RI_{DBWAX} < 1130$, and from 4 to 20 ppm for the sum of aroma compounds having a retention index $1130 \leq RI_{DBWAX} \leq 1430$.

22. The method of claim 1, wherein the wetting occurs in a sealed mixing zone to hinder the escape of the aroma components.

23. The method of claim 1, wherein about 40% to 95% of the aroma components in the coffee grounds are removed and captured.

* * * * *